United States Patent [19]

Kasper et al.

[11] Patent Number: 5,392,256
[45] Date of Patent: Feb. 21, 1995

[54] MAGNETO-ACOUSTIC SIGNAL CONDITIONER

[75] Inventors: Rolf G. Kasper, Old Lyme; Anthony B. Bruno, East Lyme, both of Conn.

[73] Assignee: The United States of America as represented by the Secretary of the Navy, Washington, D.C.

[21] Appl. No.: 130,945

[22] Filed: Oct. 4, 1993

[51] Int. Cl.$^6$ .................. H04B 11/00; H04B 1/10
[52] U.S. Cl. ....................... 367/131; 367/901
[58] Field of Search ........... 367/131, 901, 128, 134; 73/181

[56] References Cited

U.S. PATENT DOCUMENTS

| | | | |
|---|---|---|---|
| 3,842,398 | 10/1974 | Massa | 367/134 |
| 4,848,146 | 7/1989 | Bruno et al. | 73/181 |

*Primary Examiner*—Ian J. Lobo
*Attorney, Agent, or Firm*—Michael J. McGowan; Prithvi C. Lall; Michael F. Oglo

[57] ABSTRACT

An apparatus for enhancing the signal to noise ratio of piezoelectric hydrophone outputs by decoupling the turbulent velocity pressure noise from the imbedded acoustic signal. An electromagnetic turbulent velocimeter is positioned coaxially with a piezoelectric hydrophone and flush mounted in a shell structure. The velocimeter senses the changes in the electric potential caused by the velocity of a conductive fluid passing through a magnetic field normal to the shell structure surface. The velocimeter responds to electromagnetic signals and is insensitive to acoustic signals. The piezoelectric hydrophone is positioned so as to contain the electromagnetic turbulent velocimeter magnetic field within the hydrophone field of view. The hydrophone responds to conductive fluid velocity pressure variations and is insensitive to electromagnetic signals. The output frequency components of the velocimeter are correlated or coupled with those of the hydrophone. The correlated velocity frequency components are then decoupled from the hydrophone output to provide an enhanced acoustic signal output. Similarly, correlated velocity frequency components are decoupled from the electromagnetic turbulent velocimeter output to provide an enhanced electromagnetic signal output.

16 Claims, 3 Drawing Sheets

MAGNETO-ACOUSTIC SIGNAL CONDITIONER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to acoustic signal conditioning and more particularly to a means for detecting an induced voltage noise function due to local turbulent flow in combination with a piezoelectric hydrophone for detecting pressure variations due to both the local turbulent flow and imbedded acoustic signals and correlating, processing and conditioning the detected noise function and pressure variations in such a way as to substantially enhance the imbedded acoustic signals.

(2) Description of the Prior Art

It is well known that piezoelectric hydrophones are used to measure acoustic signals by producing a voltage signal corresponding to the elastic deformation of the piezoelectric components caused by pressure variations at the hydrophone face. The measurement of acoustic signals utilizing piezoelectric hydrophones suffers from the fact that the strong pressure variations due to local turbulence at the hydrophone face dominate, or mask, the relatively weak acoustic signals of interest. To reduce the effects of these unwanted pressure variations, or noise, a number of noise conditioning techniques are used to enhance the signal to noise ratio and obtain meaningful measurements of acoustic signals. However, as the fluid velocity across a hydrophone increases, the noise component increases, thus limiting the velocity envelope within which useful acoustic signal measurements can be made.

It is further well known that electromagnetic turbulent velocimeters measure the turbulent velocity structure, as illustrated in U.S. Pat. No. 4,848,146. The electric potential difference generated by a conductive fluid passing through a magnetic field is sensed by orthogonally arranged electrodes in the velocimeter. The velocimeters respond exclusively to the velocity structure and have been shown to be insensitive to far or near field acoustic excitation. As such, the velocimeters cannot be used to measure acoustic signals.

SUMMARY OF THE INVENTION

Accordingly, it is a general purpose and object of the present invention to provide a means for enhancing the signal to noise ratio of piezoelectric hydrophone outputs for detecting an acoustic signal.

It is a further object to enlarge or increase the velocity envelope in which meaningful acoustic signal measurements can be made.

Still another object is that the device provide a means for enhancing the detection of an electromagnetic signal imbedded within or masked by flow induced noise.

These objects are accomplished with the present invention by providing an apparatus combining an electromagnetic turbulent velocimeter and a piezoelectric hydrophone into a single magneto-acoustic signal conditioning device for measuring both acoustic pressure variations and fluid induced potential variations and correlating the outputs of those measurements so as to enhance imbedded acoustic and electromagnetic signals. A significant component of the hydrophone output is turbulent flow generated noise pressure. The electromagnetic turbulent velocimeter provides a measurement of the electric potential generated by the turbulent flow velocity. The frequency components in the noise pressure spectrum correlate closely with the electric potential spectrum. The frequency components of the noise pressure spectrum also contain imbedded acoustic signals not associated with turbulent flow noise. As the electric potential spectrum is only sensitive to turbulent flow velocity and not acoustic excitation, there is a lack of correlation at the frequencies corresponding to the imbedded acoustic signals. This lack of correlation (or anticoherence) serves to separate the acoustic signal from the flow noise. Similarly, electromagnetic source signals imbedded within the electric potential spectrum have no correlation with the noise pressure spectrum, thus separating these signals from the turbulent flow noise.

Preliminary investigations indicate that the noise pressure spectrum and electric potential spectrum correlation improves with increasing velocities. The correlation is strong enough that acoustic signals are distinguishable from flow noise at velocities much greater than that at which current signal conditioning techniques are no longer useful.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
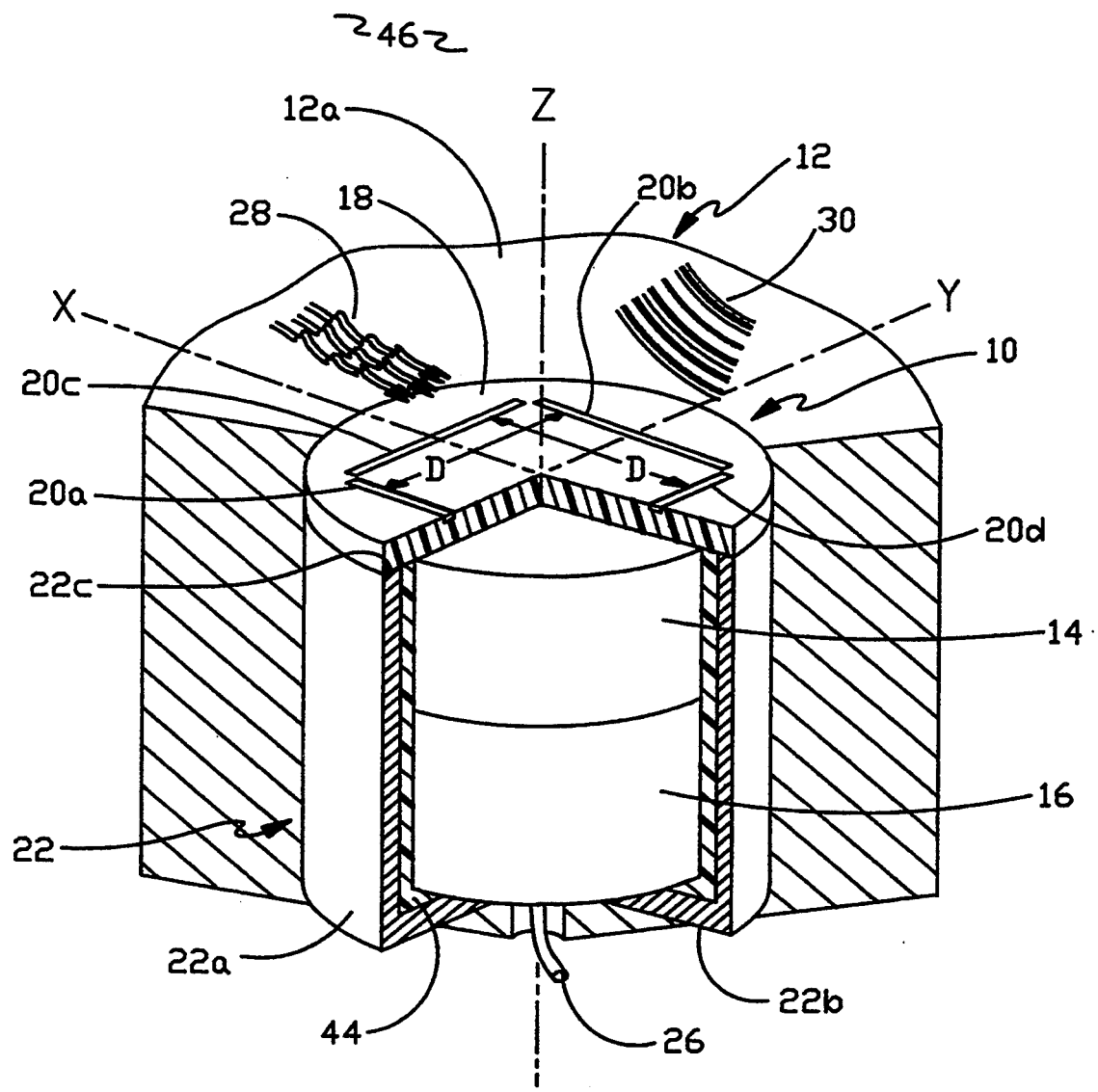
FIG. 1 shows a cutaway isometric view of a magneto-acoustic signal conditioning device according to the present invention.

Referring to FIG. 1, there is illustrated in an isometric cutaway view, magneto-acoustic signal conditioning device 10, which embodies the present invention, shown flush mounted into structure 12. Magneto-acoustic signal conditioning device 10 comprises cylindrical piezoelectric hydrophone 14, cylindrical magnet 16 and fiberglass disk 18, with hydrophone 14 and magnet 16 having equal diameters. Hydrophone 14 is disposed coaxial with and between magnet 16 and disk 18. Hydrophone 14 is permanently affixed to both magnet 16 and disk 18 using a non-magnetic bonding agent such as epoxy. Magnet 16 is chosen to provide a 0.3 to 0.8 Tesla magnetic field normal to disk 18 surface, such as would be provided by a neodymium-boron alloy magnet. Disk 18 face remote from hydrophone 14 is flush with structure 12 surface 12a. Hydrophone 14 and magnet 16 extend orthogonal to surface 12a into structure 12. The Z-axis of magneto-acoustic signal conditioning device 10 is defined as coincident with its centerline. Electromagnetic turbulent velocimeter electrode pairs 20a and b, and 20c and d, are disposed within disk 18, flush with surface 12a and in contact with external conductive fluid 46. The electrode shape is not critical and the electrode pairs can be metal strips, flat plates, metal foil or cylindrical wires. Ag/AgCl (silver/silver-chloride) wires have been used successfully. Electrode pair 20a and b is aligned in parallel with the X-axis of magneto-acoustic signal conditioning device 10, spaced a distance D apart and with each electrode equidistant from the X-axis. Electrode pair 20c and d is aligned in parallel with the Y-axis of magneto-acoustic signal conditioning device 10, also spaced a distance D apart and with each electrode equidistant from the Y-axis, thereby forming a square, the diagonal of which is smaller than the diameter of disk 18. Hydrophone 14 and magnet 16 are contained within electromagnetic shielding can 22. Can 22 prevents electromagnetic signals from directions other than external conductive fluid 46 from reaching electrode pairs 20a and b and 20c and d. Can 22 may be any non-magnetic metallic material capable of sustaining the pressures and corrosive environment of saltwater use, such as stainless steel. Can 22 comprises cylindrical portion 22a, separating the cylindrical surfaces of hydrophone 14 and magnet 16 from structure 12, annular base portion 22b separating magnet 16 circular base from structure 12, and open end ring surface 22c. The external diameter of can 22 is equal to disk 18 diameter with disk 18 disposed so as to cover and be permanently affixed to open end ring surface 22c utilizing a non-magnetic bonding agent such as epoxy. Filler material 44 fills all the interstices inside can 22. A non-magnetic polymer material, such as polyurethane, can be used for filler material 44.

Permanent magnet 16 produces a uniform magnetic field near and normal to disk 18 surface remote from hydrophone 14. Hydrophone 14 is chosen to have a relative permeability equal to 1.0 and an electrical permittivity approximately equal to 2, such as would be provided by well known PZT-4 ceramic hydrophones. These properties help maintain the magnetic field normal to disk 18 surface within the area defined by electrode pairs 20a and b, and 20c and d. Turbulent conductive fluid flow passing through this magnetic field, represented by arrows 28, generates a varying electric potential which is sensed by electrode pairs 20a and b, and 20c and d in the classic electromagnetic turbulent velocimeter manner. Pressure variations within the fluid, represented by arcs 30, are sensed by hydrophone 14 according to well known piezoelectric phenomena. Cable 26 transmits electromagnetic turbulent velocimeter and hydrophone outputs from within magneto-acoustic signal conditioning device 10, through annular base portion 22b opening, through and within structure 12 for processing.

Figure 2:
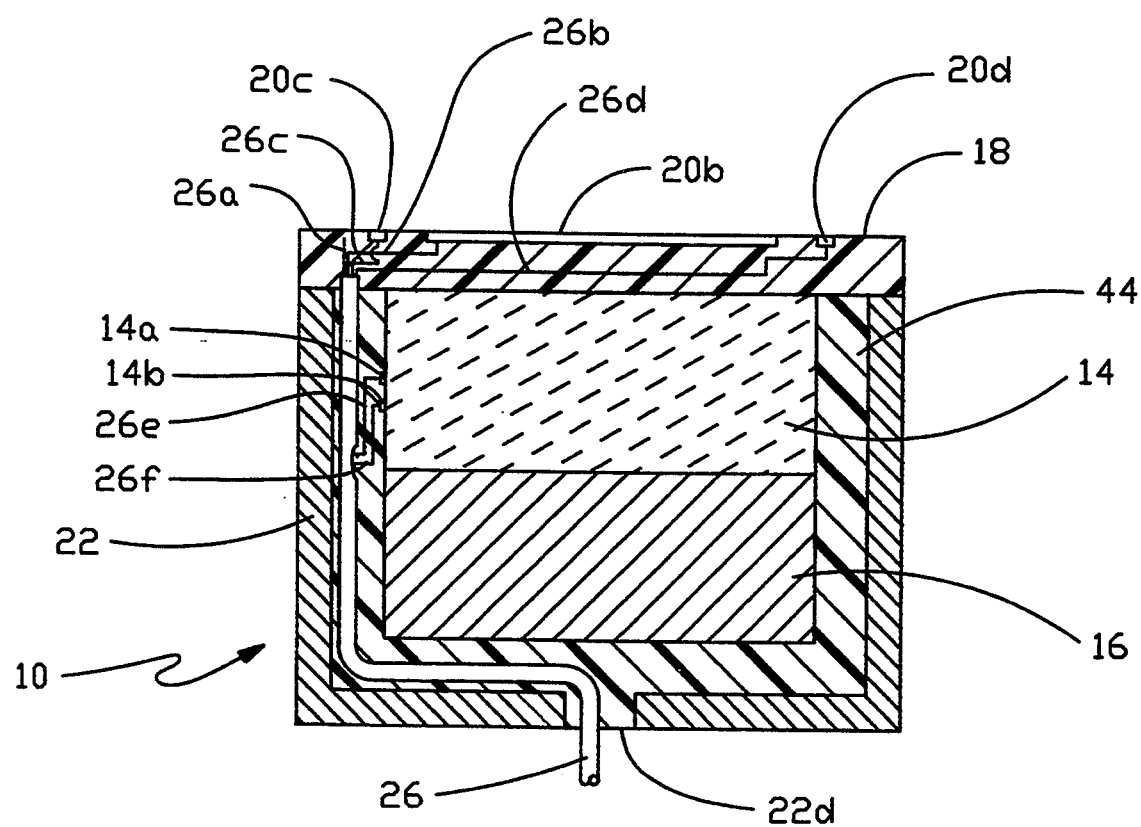
FIG. 2 shows a cross sectional view of the magneto-acoustic signal conditioning device of FIG. 1 in the X-Z plane.

Referring to FIG. 2, there is shown a cross-sectional view of magneto-acoustic signal conditioning device 10 in the X-Z plane. Signal wiring leads 26a, b, c, and d connect to corresponding electrodes 20a, b, c, and d respectively at one end, pass within disk 18, entering and passing through cable 26. Cable 26 passes through filler material 44, between can 22 and hydrophone 14, between can 22 and magnet 16 and through can 22 central circular opening 22d. Signal wiring leads 26e and f connect to hydrophone 14 output terminals 14a and b, respectively at one end, pass through filler material 44 and enter and pass through cable 26. Output terminals 14a and b are those standard for the hydrophone device chosen.

Figure 3:
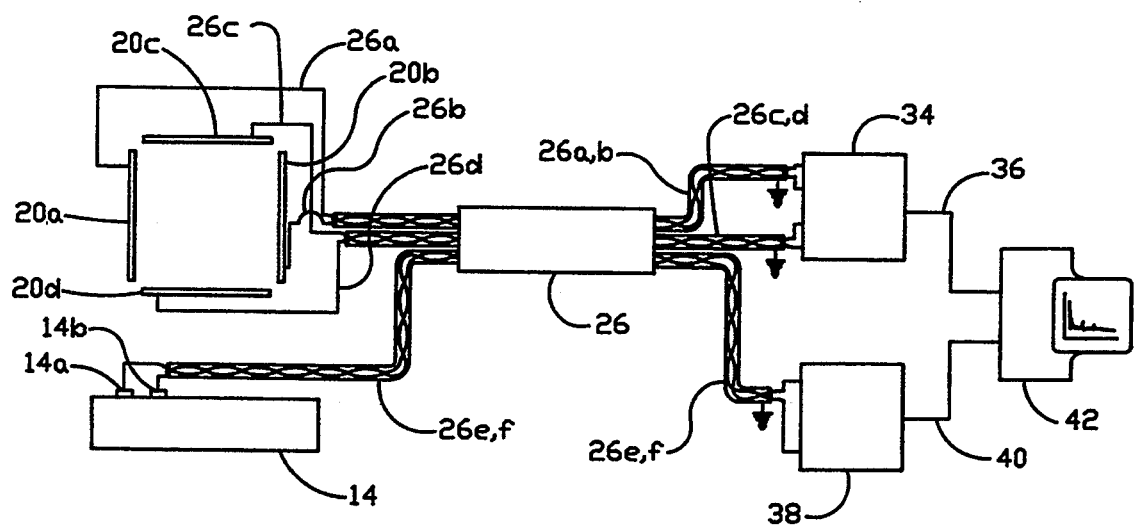
FIG. 3 illustrates a block diagram of the electric circuits of the magneto-acoustic signal conditioning device of FIG. 1.

FIG. 3 shows a block diagram of a typical electrical circuit used to correlate and condition the electromagnetic turbulent velocimeter and hydrophone signals transmitted in cable 26. Leads 26a, b, c, and d are connected to electromagnetic turbulent velocimeter electrodes 20a, b, c, d respectively at one end, pass through cable 26 and connect at the other ends thereof to electromagnetic turbulent velocimeter signal processing means 34, resulting in electromagnetic turbulent velocimeter output signal 36. Electromagnetic turbulent velocimeter signal processing means 34 can be any well known electronic circuit which will differentially amplify and post-amplify the signals from electromagnetic turbulent velocimeter electrodes 20a, b, c and d. Leads 26e and f are connected to hydrophone output terminals 14a and b respectively at one end, pass through cable 26 and connect at the other ends thereof to hydrophone signal processing means 38, resulting in hydrophone output signal 40. As with electromagnetic turbulent velocimeter signal processing means 34, signal processing means 38 can be any well known electronic circuit which will combine and amplify the signals from hydrophone 14. Signal processing means 34 and 38 can be powered by any electrical power source compatible with the electronic circuits chosen. Signal lead pair 26a and b, signal lead pair 26c and d and signal lead pair 26e and f are twisted into well known twisted shielded pair and single point ground configurations. The frequency components of electromagnetic turbulent velocimeter output signal 36 are directly dependent on the turbulent flow velocity sensed by electromagnetic turbulent velocimeter electrodes 20a, b, c and d. A significant frequency component of hydrophone output signal 40 is generated by the turbulent flow velocity pressure sensed by hydrophone 14. The turbulent velocity frequency components of electromagnetic turbulent velocimeter output signal 36 and hydrophone output signal 40 are thus correlated. Acoustic signal processing means 42 receives electromagnetic turbulent velocimeter output signal 36 and hydrophone output signal 40. Acoustic signal processing means 42 can be any one of several well known signal processing means which serve to enhance or separate the acoustic signal from the flow noise.

What has thus been described is an apparatus for enhancing the signal to noise ratio of piezoelectric hydrophone outputs by decoupling the turbulent velocity pressure noise from the imbedded acoustic signal. An electromagnetic turbulent velocimeter is positioned coaxially with a piezoelectric hydrophone. The electromagnetic turbulent velocimeter senses the changes in electrical potential caused by the velocity of seawater (a conductive fluid) passing through a magnetic field. The electromagnetic turbulent velocimeter responds to electromagnetic signals and is insensitive to acoustic signals. The piezoelectric hydrophone is positioned so as to contain the magnetic field used by the electromagnetic turbulent velocimeter within the hydrophone field of view. The piezoelectric hydrophone responds to seawater velocity pressure variations and is insensitive to electromagnetic signals. The output frequency components of the electromagnetic turbulent velocimeter are correlated, or coupled, with those of the piezoelectric hydrophone. The correlated velocity frequency components are then decoupled from the hydrophone output to provide an enhanced acoustic signal output. Similarly, correlated velocity frequency components are decoupled from the electromagnetic turbulent velocimeter output providing an enhanced electromagnetic signal output.

Obviously many modifications and variations of the present invention may become apparent in light of the above teachings. The geometric configuration of the invention can be altered from cylindrical geometry to any appropriate collinear arrangement. For example, the permanent magnet 16 and disk 18 can be rectangular and the entire assembly can be placed in a rectangular can 22. The configuration of the electromagnetic turbulent velocimeter electrode pairs can be varied to provide fine or rough scale resolution of turbulent velocity flow by respectively decreasing or increasing the distance D between them. Further, additional electrodes may be added to obtain directional or distributed turbulent velocity flow resolution. Also, signal processing means 34 and 38 can be integrated with magneto-acoustic signal conditioning device 10 by constructing the electronic signal processing circuits on micro-electronic surfaces and locating them within can 22. In this configuration, power leads for signal processing means 34 and 38 would also pass through can opening 22d. Acoustic signal processing means 42 can be an anticoherence signal processor such as a Hewlett Packard model 3562A signal analyzer which determines the frequency component correlations of output signals 36 and 40 and displays the decoupled or uncorrelated output. The display of acoustic signal processing means 42 consequently peaks at uncorrelated frequencies corresponding to imbedded electromagnetic signals within electromagnetic turbulent velocimeter output signal 36 and imbedded acoustic signals within hydrophone output signal 40. Acoustic signal processing means 42 can also employ a variable weight adaptive filter through which hydrophone output signal 40 is processed with electromagnetic turbulent velocimeter output 36 serving as a reference signal. The output of the variable weight adaptive filter represents the best least square estimate of the acoustic signal from hydrophone 14. The invention has applicability to any acoustic or electromagnetic sensors that are flow noise limited.

In light of the above, it is therefore understood that within the scope of the appended claims, the invention may be practiced otherwise than as specifically described.

What is claimed is:

1. An apparatus for enhancing acoustic and electromagnetic signal measurements in the turbulent boundary layer of the flow field of a conductive fluid moving over the surface of said apparatus, comprising:
an electromagnetic turbulent velocimeter means having a surface exposed to said flow field turbulent boundary layer, said electromagnetic turbulent velocimeter means having a magnetic field disposed normal to said surface and extending into said flow field, said electromagnetic turbulent velocimeter means providing first electrical output signals, said first electrical output signals having frequency components proportional to variations in said flow field, said frequency components produced by Lorentz forces resulting from said flow field passing through said magnetic field, said frequency components further resulting from electromagnetic signals carried in said conductive fluid;
a piezoelectric hydrophone means disposed coaxially with said electromagnetic turbulent velocimeter means, the field of view of said piezoelectric hydrophone means being coincident with said electromagnetic turbulent velocimeter means magnetic field, said piezoelectric hydrophone means providing second electrical output signals, said second electrical output signals having frequency components proportional to pressure variations in said piezoelectric hydrophone means field of view, said pressure variations resulting from velocity pressure variations in said flow field, said pressure variations further resulting from acoustic signals carried in said conductive fluid; and
an acoustic signal processing means conductively attached to said electromagnetic turbulent velocimeter means and said piezoelectric hydrophone means for receiving said first and second electrical output signals, said acoustic signal processing means enhancing said frequency components of said first electrical output signal dependent on said electromagnetic signals and enhancing said frequency components of said second output signal dependent on said acoustic signals.

2. An apparatus according to claim 1 wherein said electromagnetic turbulent velocimeter means further comprises:
an electric potential sensing means disposed at the surface of said electromagnetic turbulent velocimeter means, adjacent to said conductive fluid, affixed to said piezoelectric hydrophone means and coaxial with and within said magnetic field, said electric potential sensing means providing said first electrical output signals;
a magnetic field generating means disposed coaxial with and affixed to said piezoelectric hydrophone means, remote from said electric potential sensing means, for producing said magnetic field, said magnetic field passing through said piezoelectric hydrophone means to said conductive fluid; and
an electromagnetic turbulent velocimeter signal processing means conductively attached between said electric potential sensing means and said acoustic signal processing means, for receiving said first electrical output signals from said electric potential sensing means, differentially amplifying and post-amplifying said first electrical output signals, and transmitting said amplified first electrical output signals to said acoustic signal processing means.

3. An apparatus according to claim 2 wherein said magnetic field generating means further comprises a permanent magnet means for producing said magnetic field.

4. An apparatus according to claim 2 wherein said electric potential sensing means further comprises:
a disk of nonconductive, electromagnetically inert material, having one face overlaying and affixed to said piezoelectric hydrophone means and having the other face in contact with said conductive fluid;
a first pair of electrodes, imbedded in said disk and disposed parallel to one another for sensing electric potential variation components in a direction perpendicular to said first pair of electrodes and providing a first pair portion of said first electrical signal proportional to said electric potential variation components;
a second pair of electrodes, imbedded in said disk, disposed parallel to one another and orthogonal to said first pair of electrodes for sensing electric potential variation components in a direction perpendicular to said second pair of electrodes and providing a second pair portion of said first electrical signal proportional to said electric potential variation components, said first and second electrode pairs forming a square within said disk, said square having diagonal slightly less than said disk diameter; and an electrical conductor means, having a plurality of conductors, one each conductor being connected to one each electrode of said first and second electrode pairs, for receiving said first and second pair portions of said first electrical signal and transmitting said first electrical signal to said electromagnetic turbulent velocimeter signal processing means.

5. An apparatus according to claim 4 wherein said magnetic field generating means further comprises a permanent magnet means for producing said magnetic field.

6. An apparatus according to claim 5 wherein said permanent magnet means comprises a neodymium-boron alloy magnet for producing said magnetic field with a magnetic field strength of between 0.3 and 0.8 Tesla.

7. An apparatus according to claim 1 wherein said piezoelectric hydrophone means further comprises:
a plurality of coaxial piezoelectric ceramic disks conductively interconnected for providing said second electrical output signals;
a hydrophone signal processing means conductively attached between said piezoelectric ceramic disks and said acoustic signal processing means, for receiving said second electrical output signals from said piezoelectric ceramic disks, combining and amplifying said second electrical output signals, and transmitting said combined and amplified second an electrical output signals to said acoustic signal processing means; and
an electrical conductor means, having a plurality of conductors, one each conductor being connected to one each of said piezoelectric disks for conductively interconnecting said piezoelectric ceramic disks, said first electrical conductor means receiving said second electrical signals and transmitting said signals to said hydrophone signal processing means.

8. An apparatus according to claim 7 wherein said electromagnetic turbulent velocimeter means further comprises:
an electric potential sensing means disposed at the surface of said electromagnetic turbulent velocimeter means, adjacent to said conductive fluid, affixed to said piezoelectric hydrophone means and coaxial with and within said magnetic field, said electric potential sensing means providing said first electrical output signals;
a magnetic field generating means disposed coaxial with and affixed to said piezoelectric hydrophone means, remote from said electric potential sensing means, for producing said magnetic field, said magnetic field passing through said piezoelectric hydrophone means to said conductive fluid; and
an electromagnetic turbulent velocimeter signal processing means conductively attached between said electric potential sensing means and said acoustic signal processing means, for receiving said first electrical output signals from said electric potential sensing means, differentially amplifying and post-amplifying said first electrical output signals, and transmitting said amplified first electrical output signals to said acoustic signal processing means.

9. An apparatus according to claim 8 wherein said magnetic field generating means further comprises a permanent magnet means for producing said magnetic field.

10. An apparatus according to claim 8 wherein said electric potential sensing means further comprises:
a disk of nonconductive, electromagnetically inert material, having one face overlaying and affixed to said piezoelectric hydrophone means and having the other face in contact with said conductive fluid;
a first pair of electrodes, imbedded in said disk and disposed parallel to one another for sensing electric potential variation components in a direction perpendicular to said first pair of electrodes and providing a first pair portion of said first electrical signal proportional to said electric potential variation components;
a second pair of electrodes, imbedded in said disk, disposed parallel to one another and orthogonal to said first pair of electrodes for sensing electric potential variation components in a direction perpendicular to said second pair of electrodes and providing a second pair portion of said first electrical signal proportional to said electric potential variation components, said first and second electrode pairs forming a square within said disk, said square having diagonal slightly less than said disk diameter, one each conductor of said plurality of conductors of said electrical conductor means being connected to one each electrode of said first and second electrode pairs, for receiving said electrical signals and transmitting said signals to said electromagnetic turbulent velocimeter signal processing means.

11. An apparatus according to claim 10 wherein said magnetic field generating means further comprises a permanent magnet means for producing said magnetic field.

12. An apparatus according to claim 11 wherein said permanent magnet means comprises a neodymium-boron alloy magnet for producing said magnetic field with a magnetic field strength of between 0.3 and 0.8 Tesla.

13. An apparatus according to claim 10 wherein:
a first subset of said apparatus components comprising said electric potential sensing means, said magnetic field generating means and said piezoelectric ceramic disks is disposed in and axially perpendicular to a shell structure, having said first and second electrode pairs of said first subset coplanar with said shell structure exterior surface in contact with said conductive fluid, said apparatus components not contained within said first subset comprising a second subset of said apparatus components, said second subset further comprising said electromagnetic turbulent velocity signal processing means and said hydrophone processing means, said second subset being disposed in the interior of said shell structure, said electrical conductor means passing from said first subset, through said shell structure and to the interior of said shell structure;
said disk diameter is larger than and extends beyond said piezoelectric hydrophone means;
an electromagnetic shielding means is disposed surrounding said magnetic field generating means, said piezoelectric ceramic disks and said first and second electrical conductor means, separating said magnetic field generating means, said piezoelectric ceramic disks and said first and second electrical conductor means from said shell structure, said electromagnetic shielding means abutting and being affixed to said disk circular face extending beyond said piezoelectric hydrophone means, remote from said conductive fluid, said electromagnetic shielding means having an opening therethrough for the passage of said first and second electrical conductor means from said first subset to said apparatus components in the interior of said shell structure; and a filler material is dispersed within said electromagnet shielding means, said filler material filling the interstices within said electromagnetic shielding means.

14. An apparatus according to claim 10 wherein:

a subset of said apparatus components comprising said electromagnetic turbulent velocimeter means and said piezoelectric hydrophone means is disposed in and axially perpendicular to a shell structure, having said first and second electrode pairs of said subset coplanar with said shell structure exterior surface in contact with said conductive fluid, said apparatus components not contained within said subset being disposed in the interior of said shell structure;

said disk diameter is larger than and extends beyond said piezoelectric hydrophone means;

an electromagnetic shielding means is disposed surrounding said magnetic field generating means, said electromagnetic turbulent velocimeter signal processing means, said piezoelectric ceramic disks, said hydrophone signal processing means and said first and second electrical conductor means, separating said magnetic field generating means, said electromagnetic turbulent velocimeter signal processing means, said piezoelectric ceramic disks, said hydrophone signal processing means and said first and second electrical conductor means from said shell structure, said electromagnetic shielding means abutting and being affixed to said disk circular face extending beyond said piezoelectric hydrophone means, remote from said conductive fluid, said electromagnetic shielding means having an opening therethrough for the passage of said first and second electrical output signals from said subset to said apparatus components in the interior of said shell structure; and a filler material is dispersed within said electromagnetic shielding means, said filler material filling the interstices within said electromagnetic shielding means.

15. An apparatus according to claim 4 wherein:

a first subset of said apparatus components comprising said electric potential sensing means, said magnetic field generating means and said piezoelectric hydrophone means is disposed in and axially perpendicular to a shell structure, having said first and second electrode pairs of said first subset coplanar with said shell structure exterior surface in contact with said conductive fluid, said apparatus components not contained within said first subset comprising a second subset of said apparatus components, said second subset further comprising said electromagnetic turbulent velocity signal processing means, said second subset being disposed in the interior of said shell structure;

said disk diameter is larger than and extends beyond said piezoelectric hydrophone means;

an electromagnetic shielding means is disposed surrounding said magnetic field generating means, said first electrical conductor means and said piezoelectric hydrophone means, separating said magnetic field generating means, said first electrical conductor means and said piezoelectric hydrophone means from said shell structure, said electromagnetic shielding means abutting and being affixed to said disk circular face extending beyond said piezoelectric hydrophone means, remote from said conductive fluid, said electromagnetic shielding means having an opening therethrough for the passage of said first electrical conductor means and said second electrical output signals from said first subset to said apparatus components in the interior of said shell structure; and a filler material is dispersed within said electromagnetic shielding means, said filler material filling the interstices within said electromagnetic shielding means.

16. An apparatus according to claim 10 wherein:

a first subset of said apparatus components comprising said electromagnetic turbulent velocimeter means and said piezoelectric ceramic disks is disposed in and axially perpendicular to a shell structure, having said first and second electrode pairs of said first subset coplanar with said shell structure exterior surface in contact with said conductive fluid, said apparatus components not contained within said first subset comprising a second subset of said apparatus components, said second subset further comprising said hydrophone signal processing means, said second subset being disposed in the interior of said shell structure;

said disk diameter is larger than and extends beyond said piezoelectric hydrophone means;

an electromagnetic shielding means is disposed surrounding said magnetic field generating means, said electromagnetic turbulent velocimeter signal processing means, said first electrical conductor means and said piezoelectric ceramic disks, separating said magnetic field generating means, said electromagnetic turbulent velocimeter signal processing means, said first electrical conductor means and said piezoelectric ceramic disks from said shell structure, said electromagnetic shielding means abutting and being affixed to said disk circular face extending beyond said piezoelectric hydrophone means, remote from said conductive fluid, said electromagnetic shielding means having an opening therethrough for the passage of said first and second electrical output signals from said first subset to said apparatus components in the interior of said shell structure; and a filler material is dispersed within said electromagnetic shielding means, said filler material filling the interstices within said electromagnetic shielding means.

* * * * *